Figure 1:
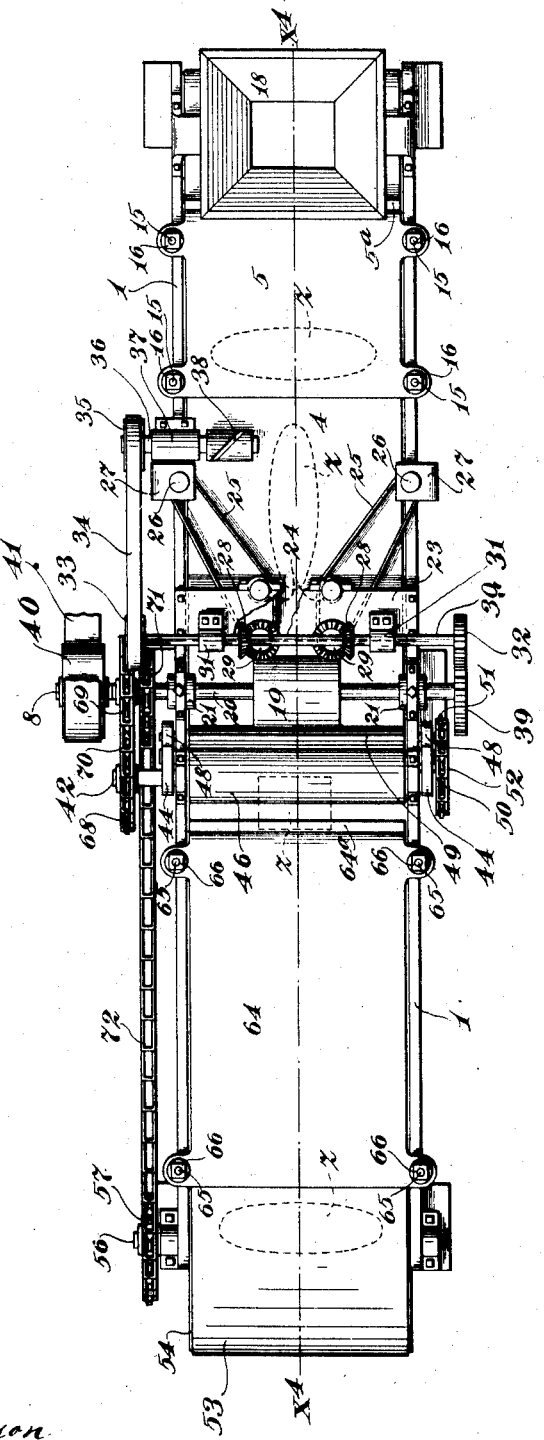

No. 883,370. PATENTED MAR. 31, 1908.
W. H. WOOD.
BREAD KNEADING AND MOLDING MACHINE.
APPLICATION FILED SEPT. 18, 1907.

5 SHEETS—SHEET 1.

Witnesses:
L. L. Simpson,
A. H. Opsahl.

Inventor:
Wm H. Wood.
By his Attorneys.
Williamson Merchant

No. 883,370. PATENTED MAR. 31, 1908.
W. H. WOOD.
BREAD KNEADING AND MOLDING MACHINE.
APPLICATION FILED SEPT. 18, 1907.

5 SHEETS—SHEET 2.

Witnesses:
L. L. Simpson
U. H. Opsahl

Inventor:
Wm. H. Wood
By his Attorneys:
Williamson Merchant

No. 883,370. PATENTED MAR. 31, 1908.
W. H. WOOD.
BREAD KNEADING AND MOLDING MACHINE.
APPLICATION FILED SEPT. 18, 1907.

5 SHEETS—SHEET 3

Witnesses:
L. L. Simpson.
A. H. Opsahl.

Inventor:
Wm. H. Wood
By his Attorneys.
Williamson & Merchant

No. 883,370. PATENTED MAR. 31, 1908.
W. H. WOOD.
BREAD KNEADING AND MOLDING MACHINE.
APPLICATION FILED SEPT. 18, 1907.

5 SHEETS—SHEET 4.

Witnesses:
L. L. Simpson
A. H. Opsahl

Inventor:
Wm. H. Wood
By his Attorneys:
Williamson Merchant

No. 883,370. PATENTED MAR. 31, 1908.
W. H. WOOD.
BREAD KNEADING AND MOLDING MACHINE.
APPLICATION FILED SEPT. 18, 1907.
5 SHEETS—SHEET 5.
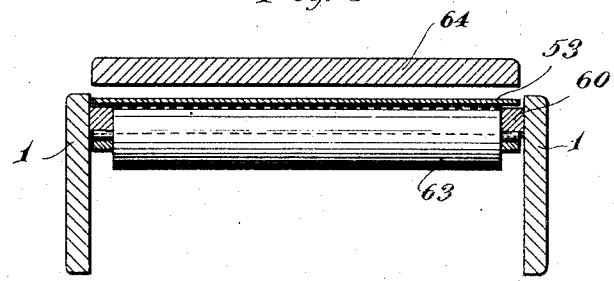
Fig. 5
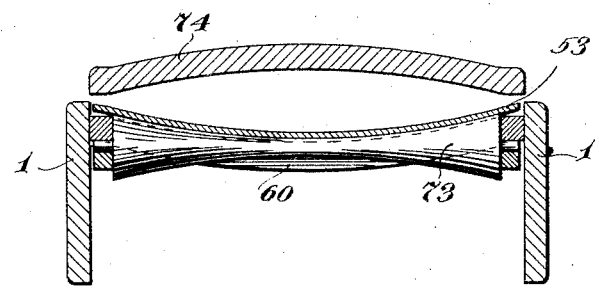
Fig. 5ª
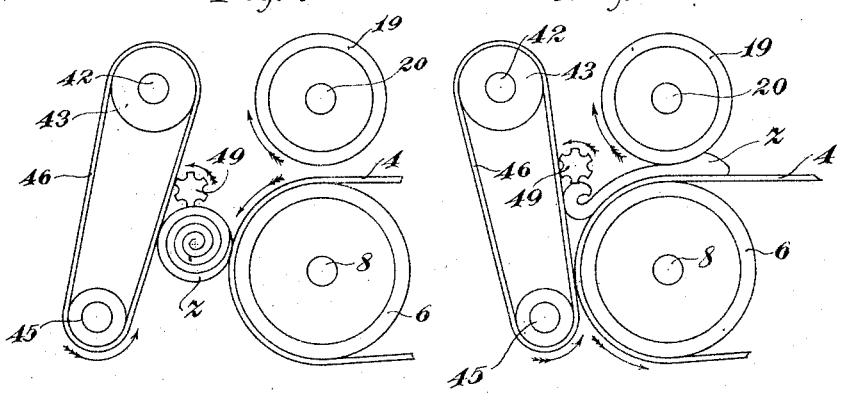
Fig. 7    Fig. 6
Witnesses:
L. L. Simpson
A. H. Opsahl
Inventor:
Wm H. Wood
By his Attorneys
Williamson Merchant

UNITED STATES PATENT OFFICE.

WILLIAM H. WOOD, OF MINNEAPOLIS, MINNESOTA.

BREAD KNEADING AND MOLDING MACHINE.

No. 883,370.

Specification of Letters Patent.

Patented March 31, 1908.

Application filed September 18, 1907. Serial No. 393,484.

*To all whom it may concern:*

Be it known that I, WILLIAM H. WOOD, a citizen of the United States, residing at Minneapolis, in the county of Hennepin and State of Minnesota, have invented certain new and useful Improvements in Bread Kneading and Molding Machines; and I do hereby declare the following to be a full, clear, and exact description of the invention, such as will enable others skilled in the art to which it appertains to make and use the same.

My invention has for its object to provide a machine of increased efficiency, particularly adapted for use in kneading and molding dough in the manufacture of loaves of bread, and to the above ends the invention consists of the novel devices and combinations of devices hereinafter described and defined in the claims.

As is a well known fact, the yeast used to cause the bread to rise produces in the dough numerous cells that are filled with gas. When a dough loaf or body is rolled in one direction, the cells thereof are all elongated in the same direction, to-wit, in the same direction in which the loaf is elongated by rolling, and this produces a thinness of the walls of the cells in a direction transversely of the rolled loaf. Continued rolling in the same direction will, therefore, cause the walls of many of the cells to be broken with the result that the dough will fall and produce a heavy and soggy loaf. If, however, the dough loaf be rolled first in one direction and then in a direction approximately at a right angle to the direction in which it is first rolled, the cells of the dough will thereafter be left as nearly as possible in spherical form confined within wall portions of sufficient strength to hold the confined gas. In working bread dough by hand, the above noted desired result is accomplished, but I believe that I am the first to provide a machine by means of which this result can be accomplished.

In the accompanying drawings I have illustrated a machine embodying the several features of my invention in a form and arrangement which in actual practice has been found highly efficient for the purposes above indicated.

In said drawings, like characters indicate like parts throughout the several views.

Figure 2:
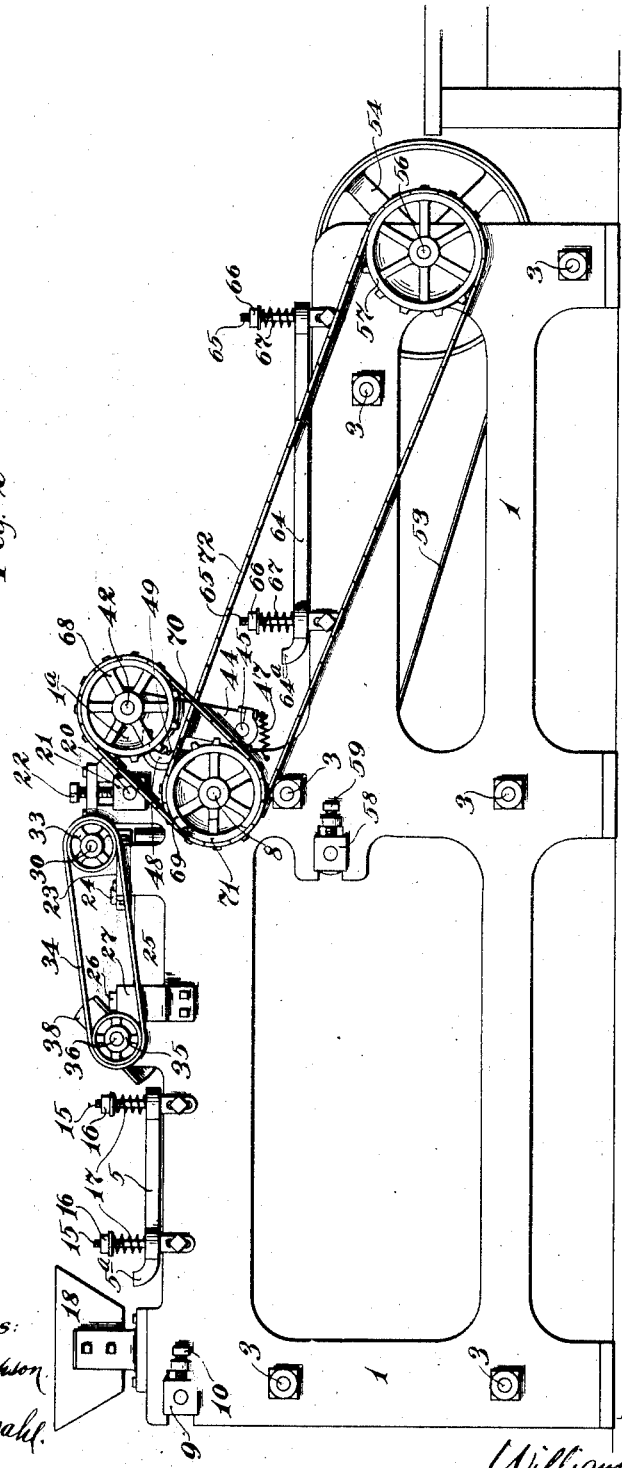
Figure 3:
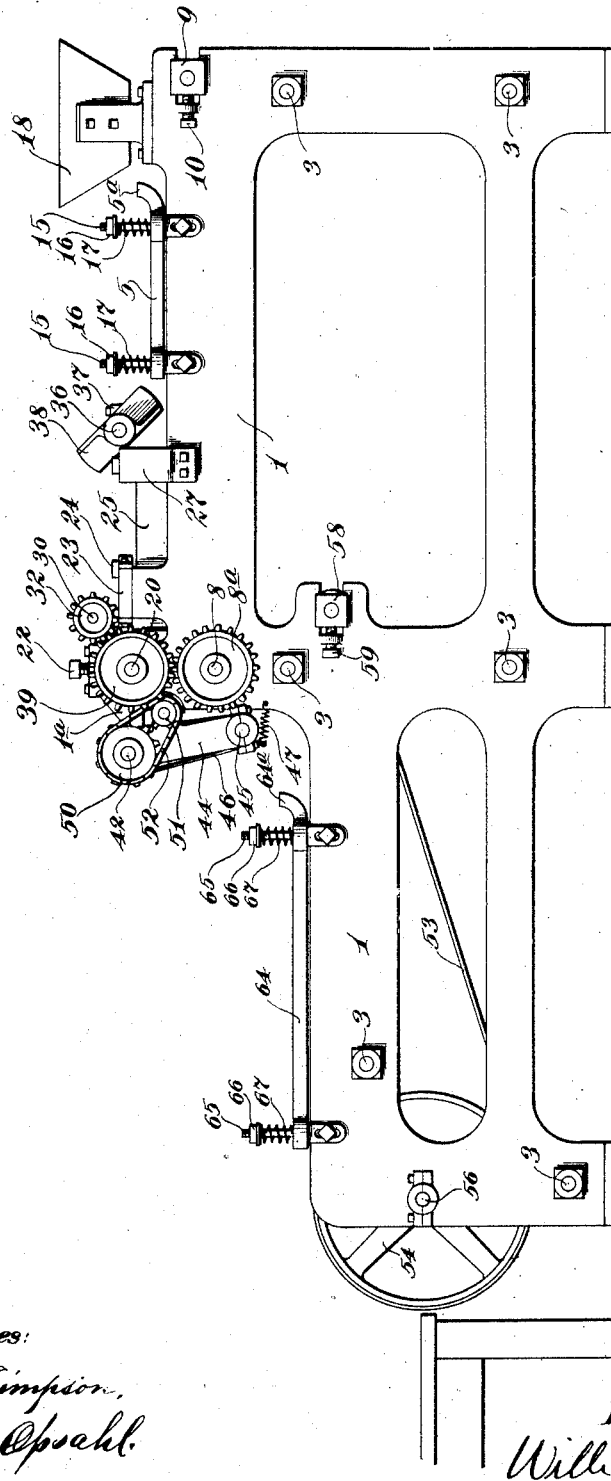
Figure 4:
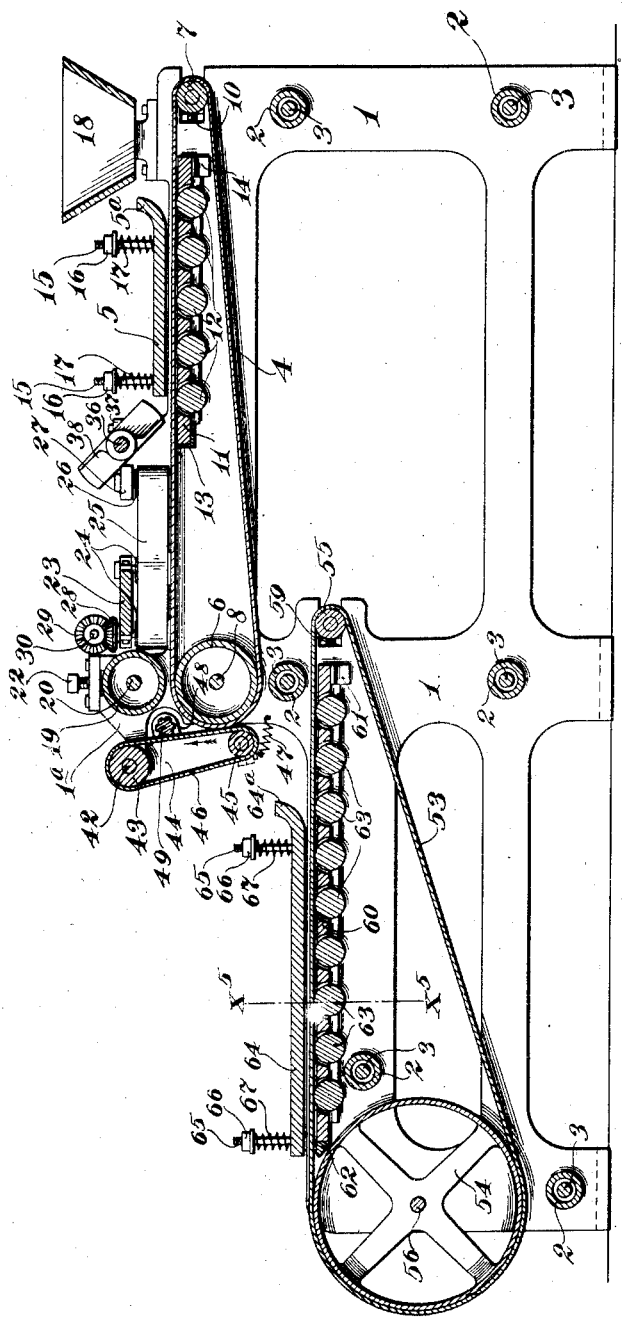

Referring to the drawings, Figure 1 is a plan view, showing the complete kneading and molding machine. Figs. 2 and 3 show the improved machine, respectively in right and left side elevation. Fig. 4 is a vertical longitudinal section taken through the machine on the line $x^4$ $x^4$ of Fig. 1. Fig. 5 is an enlarged transverse vertical section taken approximately on the line $x^5$ $x^5$ of Fig. 4. Fig. 5ª is a view corresponding to Fig. 5, but illustrating a slightly modified construction, and Figs. 6 and 7 are diagrammatic views in side elevation, illustrating the coiling device for action on the flattened dough loaf to coil or turn the same into a roll.

All parts of the machine are supported, directly or indirectly, by a heavy framework which, as shown, is made up of laterally spaced upright bearing frames 1 that are spaced apart by sleeves 2 and tied together by nutted rods 3.

The machine illustrated in the drawings comprises, as its principal coöperating devices, so-called primary and secondary loaf rolling devices, a so-called loaf shifting device, coöperating loaf flattening rollers or devices, and a so-called loaf coiling device. By the primary rolling device the loaf is rolled and elongated in one direction; by the loaf shifting device the loaf, after passing from the primary rolling device, is shifted or turned endwise through approximately 90 degrees, so that it is delivered endwise between the flattening rollers; by the coiling device, the flattened roll is coiled or turned into a roll and is delivered to the secondary rolling device; and by the secondary rolling device the dough loaf is rolled in a direction transversely of and approximately at a right angle to the direction in which it was rolled by the said primary rolling device.

The primary rolling device, as its principal element, comprises an endless apron or belt 4, preferably of heavy folded canvas, and a coöperating overlying yieldingly mounted presser plate 5. This apron 4 runs over a relatively large roller 6 and relatively small idle roller 7. The large roller 6, as will hereinafter appear, serves as the lower member of the pair of loaf flattening rollers, and its shaft 8 is suitably journaled in the side frames 1. The idle roller 7 is shown as mounted in bearing boxes 9, adjustably mounted on the side frames 1 and subject to adjusting screws 10. The upper intermediate portion of the apron 4 runs over a table 11 that is preferably cut away and provided with loosely journaled pressure resisting rollers 12 that serve to reduce the frictional contact between said belt 4 and table 11. The table 11 is preferably detachably held in working position by angular lugs 13—14 secured to the side brackets 1.

The presser plate 5 is held in working position with freedom for limited vertical movements by means of vertically disposed guide rods or studs 15 secured to the upper edges of the side frames 1. On the threaded upper ends of the guide rods 15 are nuts 16, and on said rods are coiled springs 17 that react against said nuts 16 and against said presser plate to force the latter downward with a tension that is variable by adjustments of the said nuts. The forwardly projecting edge $5^a$ of the presser plate 5 is curved upward so that the dough loaf carried by the receiving portion of the belt 4 would be carried under the said presser plate, causing the latter to rise.

The dough loaf, which usually comes from the mixer and is cut to proper size by a so-called divider, would be delivered into a hopper 18 which, as shown, is secured to the side frames 1 in position to deliver onto the apron 4 just in front of the up-turned edge $5^a$ of the presser plate 5.

Overlying the roller 6 is a coöperating loaf flattening roller 19, the shaft 20 of which, as shown, is journaled in boxes 21 that are adjustably mounted in the side frames 1 and are adapted to be held in different vertical adjustments by screws 22. Rigidly secured to the side frames 1 and extending transversely across the machine, in front of the roller 19, is a supporting bar 23. Two laterally spaced pairs of pulleys 24 are journaled to the supporting bar 23 and are located below the same, one pair on each side of the transverse center of the machine, and just in front of the short upper roller 19. The loaf centering belts 25 run over the coöperating rollers 24 and over horizontally alined coöperating rollers 26 which, as shown, are journaled to the under side of angular bearings 27 rigidly secured to the side frames 1. The forwardly extended portions of these centering belts 26 converge toward the roller 19. The shaft of one of each pair of rollers 24 is provided with a miter gear 28 that meshes with one of a pair of miter gears 29 secured to a transverse shaft 30 mounted in suitable bearings 31 on the bar 23. This shaft 30, at one end, is provided with a spur pinion 32 and at its other end with a pulley 33. A belt 34 runs over the pulley 33 and over a pulley 35 carried by a short shaft 36 journaled in a suitable bearing 37 on one of the side frames 1. The inner end of this shaft 36 carries obliquely set blades 38 that work close to the upper portion of the apron 4 at one side of the transverse center of the machine, and serves as a loaf shifting device, as will hereinafter more clearly appear.

The roller shaft 20, at one end, is provided with a spur gear 39 that meshes with the pinion 32 of the shaft 30, and a spur gear $8^a$ of the roller shaft 8, and at its other end it is provided with a pulley 40 over which a power driven belt 41 runs to impart motion to said shaft 20, and from thence to all the running parts of the machine.

The side frames 1 are provided with rearwardly projecting bearing arms $1^a$ in the vicinity of the roller shaft 20, and in these arms a shaft 42 is journaled. The shaft 42 carries a roller 43, and on the end portions of said shaft is pivoted a short frame made up of laterally spaced arms 44. In the lower ends of the arms 44 is journaled an idle roller 45. A belt 46 runs over the rollers 43 and 45 and is driven in the direction of the arrows marked adjacent thereto on Figs. 4, 6 and 7. One or more light coiled springs 47 yieldingly draw the lower end portions of the arms 44 forward so that the belt 46 tends to maintain frictional engagement with the apron 4. The arms 44 are provided with forwardly projecting lugs 48 in which a coiling roller 49 is journaled. This roller 49 works close to the intermediate forward portion of the coiling belt 46 and is driven in the direction of the arrows marked adjacent thereto on Figs. 6 and 7. This roller 49 is preferably, but not necessarily, corrugated. At one end, the shaft 42 is provided with a sprocket 50 over which and a sprocket 51 on one end of the shaft of the roller 49 runs a sprocket chain 52. The so-called secondary rolling device is of very much the same construction as the said primary rolling device. Its endless apron or feed belt 53 runs over a large roller or drum 54 and over a small roller 55. The shaft 56 of the drum 54 is journaled in the side frames 1 and is provided with a sprocket 57. The shaft of the small roller 55 is journaled in bearing boxes 58 that are adjustably mounted in the side frames 1 and are subject to adjusting screws 59. The upper horizontally extended portion of the apron 53 runs over a table 60 that is detachably supported by angular bearings 61—62 secured to the side frames 1. At suitable intervals, the table 60 is provided with loosely journaled bearing rollers 63 that serve to reduce the friction between the apron 53 and the table 60.

The presser plate 64 that coöperates with the upper portion of the apron 53 and overlies the same, is mounted for vertical movement on upright rods 65 rigidly secured at their lower ends to the side brackets 1, and provided at their threaded upper ends with nuts 66 between which and said plate 64 coiled springs 67 are compressed. The forwardly projecting edge of the presser plate 64 is curved upward, as shown, at $64^a$.

At one end, the heretofore noted roller shaft 42 is provided with a sprocket 68 that alines with a sprocket 69 on the shaft 8 of the roller 6. A sprocket chain 70 runs over the two sprockets 68 and 69. On the shaft 8, adjacent to the sprocket 69, is a like sprocket 71 over which and the sprocket 57 on the roller shaft 56 runs a sprocket chain 72.

Fig. 5ª illustrates a modified construction which is used when oval loaves, such as the usual rye loaf, are to be made. In this modified construction, concave rollers 73 are substituted for the table rollers 12 and 63, and upwardly convexed presser plates 74 are substituted for the presser plates 5 and 64. In Figs. 1, 6, and 7 of the drawings, the dough loaf is indicated by the character $z$, and in said Fig. 1 said loaf is indicated by dotted lines.

From the receiving hopper 18 the dough loaf drops onto the receiving portion of the traveling apron 4 and is thereby carried under the primary presser plate 5, which plate yields so as to permit the loaf to pass thereunder. The presser plate 5 carries the upper portion of the loaf while the lower portion of the loaf is carried forward by the apron 4, thereby rolling the loaf over and over and elongating the same. The rearmost springs 17 of this primary rolling device are first caused to yield so that the rear edge of the said plate 5 is first turned upward, and as the loaf is passed forward, the forward springs 17 yield so that the forward edge of said plate is then turned upward. The said presser plate, therefore, has a sort of rocking action as the loaf passes under the same.

The loaf rolled, and elongated in a direction transversely of the machine, is carried forward from the primary presser plate 5 until the right hand thereof is engaged by one of the oblique blades 38 of the so-called loaf shifting device, and the loaf is then turned into a position extending longitudinally of the machine. The loaf thus turned is, by the aliming belts 25 and the apron 4, carried endwise between the so-called flattening rollers 6 and 19, and by these rollers is flattened out approximately as shown in Fig. 6. The end of this flattened loaf is carried against the upwardly moving portion of the coiling belt 46, and by the latter is moved upward into engagement with the coiling roller 49. By the combined action of the coiling belt and coiling roller moving in the directions of the arrows marked adjacent thereto in Figs. 6 and 7, and by the motion imparted thereto by the so-called flattening rollers, the flattened loaf is rolled into a coil, as shown in Fig. 7. The loaf is thus coiled or rolled up in a direction at right angles to or transversely of the direction in which the loaf was rolled by the primary rolling device, to-wit, by the apron 4 and coöperating presser plate 5. As the size of the coiled loaf increases, the coiling belt 46 moves outward, as indicated in Fig. 7, and when the coil has been completed and has been given a rubbing finish or "skin" by the action on the exterior thereof of the belts 4, 46 and roller 49, it is dropped into the receiving portion of the traveling apron 53 of the so-called secondary rolling device. By this belt 53 the coiled loaf is carried under the presser plate 64 and is pressed together and rolled in the same direction in which it was coiled, and in a direction transverse to the direction in which it was rolled by the primary rolling device. Under the rolling action produced thereon by the secondary rolling device, the loaf is again elongated and is given approximately the form desired for baking.

In actual practice a machine constructed substantially as shown in the drawings has been found highly efficient for the purposes had in view.

What I claim is:

1. In a dough kneading and molding machine, the combination with primary and secondary rolling devices, of means interposed between said two rolling devices for action on the dough to flatten and coil the same, substantially as described.

2. In a dough kneading and molding machine, the combination with primary and secondary rolling devices, of means for shifting, flattening and coiling the dough loaf as it is passed from said primary rolling device to said secondary rolling device, substantially as described.

3. In a dough kneading and molding machine, the combination with primary and secondary rolling devices, each comprising an endless apron and a coöperating presser plate, of flattening rollers interposed between said two rolling devices, a shifting device operative on the dough loaf as the same is passed from said primary rolling device to said flattening rollers, and means for coiling the flattened loaf as the same is passed from said flattening rollers to said secondary rolling device, substantially as described.

4. In a dough kneading and molding machine, the combination with primary and secondary rolling devices, each comprising an endless apron and a coöperating presser plate, of means for flattening and coiling the loaf as it is passed from said primary to said secondary rolling devices, said coiling means comprising a yielding belt arranged for coöperation with the delivery portion of the endless apron of said primary rolling device, substantially as described.

5. In a dough kneading and molding machine, the combination with primary and secondary rolling devices, each comprising an endless apron and coöperating presser plate, with the apron of the former overlapping the apron of the latter, a pair of flattening rollers, over the lower of which the apron of said primary rolling device is passed, and a coiling device comprising a roller and a coöperating endless belt, the latter having its lower portion yieldingly held for coöperation with the delivery portion of the apron of said primary rolling device, substantially as described.

6. In a dough kneading and molding machine, the combination with primary and secondary rolling devices, each comprising an endless apron and a coöperating yielding presser plate, of a pair of flattening rollers, over one of which the apron of said primary rolling device is passed, and a coiling device comprising a roller and a coöperating yieldingly mounted endless coiling belt arranged for coöperation with the delivery portion of the apron of said primary rolling device, substantially as described.

7. In a dough kneading and molding machine, the combination with primary and secondary rolling devices, each comprising an endless apron and a coöperating yielding presser plate, of a pair of flattening rollers, over the lower of which the apron of said primary rolling device is passed, a loaf shifting device arranged for operation on the loaf as it is passed from said primary rolling device to said flattening rollers, and means for coiling the flattened loaf as it is passed to said secondary rolling device, substantially as described.

8. In a machine of the kind described, means for rolling, flattening and coiling the loaf, substantially as described.

9. In a machine of the kind described, means for rolling, flattening, coiling and again rolling the loaf, substantially as described.

In testimony whereof I affix my signature in presence of two witnesses.

WILLIAM H. WOOD.

Witnesses:
  MALIE HOEL,
  F. D. MERCHANT.